(12) United States Patent
Madolora et al.

(10) Patent No.: US 9,108,868 B1
(45) Date of Patent: Aug. 18, 2015

(54) TREATMENT OF POTABLE WATER

(71) Applicant: Premier Magnesia, LLC, West Conshohocken, PA (US)

(72) Inventors: Matthew P. Madolora, Austin, TX (US); J. Peter Ahl, Kennett Square, PA (US)

(73) Assignee: Premier Magnesia, LLC, West Conshohocken, PA (US)

( * ) Notice: Subject to any disclaimer, the term of this patent is extended or adjusted under 35 U.S.C. 154(b) by 0 days.

(21) Appl. No.: 14/340,862

(22) Filed: Jul. 25, 2014

Related U.S. Application Data

(60) Provisional application No. 61/978,328, filed on Apr. 11, 2014, provisional application No. 61/898,150, filed on Oct. 31, 2013.

(51) Int. Cl.
*C02F 1/52* (2006.01)
*C02F 3/00* (2006.01)
*C02F 1/56* (2006.01)
*C02F 103/00* (2006.01)
*C02F 103/06* (2006.01)

(52) U.S. Cl.
CPC .......... *C02F 1/5245* (2013.01); *C02F 1/5209* (2013.01); *C02F 3/00* (2013.01); *C02F 1/56* (2013.01); *C02F 2103/007* (2013.01); *C02F 2103/06* (2013.01); *C02F 2209/06* (2013.01); *C02F 2209/07* (2013.01); *C02F 2303/20* (2013.01)

(58) Field of Classification Search
CPC ........ C02F 1/5245; C02F 3/00; C02F 1/5209; C02F 1/56; C02F 2103/007; C02F 2103/06; C02F 2209/06; C02F 2209/07; C02F 2303/20
USPC ......... 210/723, 724, 726, 729, 732, 733, 734, 210/735
See application file for complete search history.

(56) References Cited

U.S. PATENT DOCUMENTS

| | | | | |
|---|---|---|---|---|
| 6,235,339 | B1 * | 5/2001 | Harmon et al. | 426/646 |
| 6,319,412 | B1 * | 11/2001 | Reyna | 210/666 |
| 7,410,584 | B2 * | 8/2008 | Devine | 210/605 |
| 2003/0201225 | A1 * | 10/2003 | Josse et al. | 210/605 |
| 2007/0119782 | A1 * | 5/2007 | Rawson et al. | 210/650 |
| 2009/0078648 | A1 * | 3/2009 | Torrijos et al. | 210/618 |
| 2012/0024719 | A1 * | 2/2012 | Botte | 205/742 |
| 2012/0228229 | A1 * | 9/2012 | Douglas | 210/662 |

* cited by examiner

*Primary Examiner* — Fred Prince
(74) *Attorney, Agent, or Firm* — Jeffrey T. Placker; Holland & Knight LLP

(57) ABSTRACT

Methods and systems for treating water for potable use or consumption are described. In an embodiment, a method for treating water for potable may include adding an effective amount of a magnesium compound to supply water to be treated. The method may also include adding an effective amount of a flocculation aiding metal salt to the supply water. The method may further include removing one or more contaminants from the supply water to provide treated water. Other methods and systems are described.

32 Claims, 1 Drawing Sheet

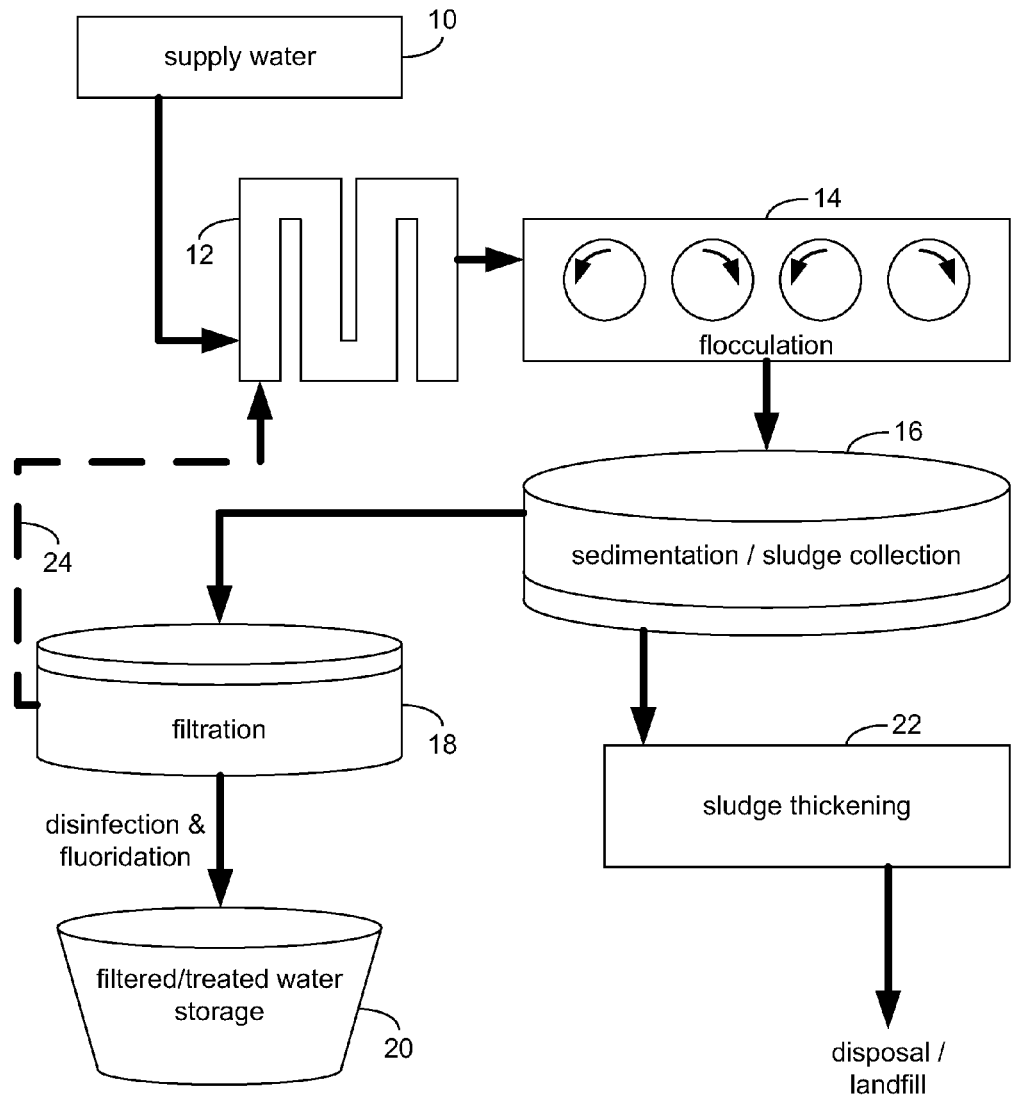

TREATMENT OF POTABLE WATER

CROSS-REFERENCE TO RELATED APPLICATIONS

This application claims the benefit of U.S. provisional patent application Ser. No. 61/978,328, entitled "Treatment of Potable Water" filed on Apr. 11, 2014; this application also claims the benefit of U.S. provisional patent application Ser. No. 61/898,150, entitled "Treatment of Potable Water" filed on Oct. 31, 2013, the entirety of both of which applications is incorporated herein by reference.

TECHNICAL FIELD

The present disclosure generally relates to potable water treatment, and more particularly relates to the use of magnesium compounds in the treatment of potable water.

BACKGROUND

Potable water treatment systems may typically be designed to take a raw water supply, whether from surface sources, such as rivers, lakes, reservoirs, or from groundwater sources, such as wells and aquifers, and process the raw water for distribution and consumption. The processing may involve removing constituents from the water that may be harmful, and may also include removing other constituents that may impart undesirable color, taste, turbidity or odor. The removed constituents may be in the form of dissolved solids or gases, suspended solids or gases, miscible or immiscible liquids, and may be organic and/or inorganic in nature. These constituents are often measured as Total Organic Carbon ("TOC"), Total Dissolved Solids ("TDS"), Total Suspended Solids ("TSS"), and Turbidity ("NTU"). In some situations, specific constituents such as minerals may be identified in more detail.

SUMMARY

In an implementation, a method may include adding an effective amount of a magnesium compound to supply water to be treated. The method may also include adding an effective amount of a flocculation aiding metal salt to the supply water. The method may further include removing one or more contaminants from the supply water to provide treated water.

One or more of the following features may be included. The magnesium compound includes one or more of magnesium hydroxide and magnesium oxide. The magnesium hydroxide may exhibit an alkaline magnesium hydroxide purity of between about 85% to about 100%. The magnesium hydroxide may exhibit a caustic magnesia activity of between about 50 seconds to about 1440 minutes. The magnesium hydroxide may exhibit a particle size of between about 0.1 micron to about 50 microns. The magnesium hydroxide may exhibit a specific surface area of between about 9 $m^2/g$ to about 200 $m^2/g$. The magnesium hydroxide may exhibit a stabilized residuals test value of between about 1 milligram to about 50 grams. The magnesium oxide may exhibit an alkaline magnesium oxide purity of between about 85% to about 100%. The magnesium oxide may exhibit a caustic magnesia activity of between about 50 seconds to about 1000 seconds. The magnesium oxide may exhibit a particle size of between about 0.1 micron to about 30 microns. The magnesium oxide may exhibit a specific surface area of between about 9 $m^2/g$ to about 300 $m^2/g$.

The flocculation aiding metal salt may include one or more of alum, ferrous sulfate, ferric sulfate, ferrous chloride, and ferric chloride. Adding the effective amount of the magnesium compound may include adding the magnesium compound to the supply water prior to adding the flocculation aiding metal salt. Adding the effective amount of the magnesium compound may include adding the magnesium compound generally along with adding the flocculation aiding metal salt.

Adding the effective amount of the magnesium compound includes measuring a quality of the treated water. The method may further include adjusting the effective amount of the magnesium compound based upon, at least in part, the measured quality of the treated water. The quality of the treated water may include one or more of an alkalinity of the treated water and a pH of the treated water. The quality of the treated water may include a corrosivity of the treated water as indicated by a Langelier Index of the treated water. The method may further include determining an anticipated alkalinity depletion associated with adding the flocculation aiding metal salt. The effective amount of the magnesium compound may be based upon, at least in part, amount offsetting at least a portion of the anticipated alkalinity depletion.

The method may further include adding an effective amount of a polymer contaminant removal aid including one or more of polyepichlorohydrin-dimethylamine, polyamine, polydiallyl-dimethylammonium chloride (polyDADMAC), polyacrylate, polyamide, a Mannich polymer, and polyacrylamide. Adding the magnesium compound may include adding an admixture of the magnesium compound and a alkaline earth metal compound. Removing one or more contaminants from the supply water may include one or more of flocculation, coagulation, sedimentation, and filtration. Removing one or more contaminants from the supply water may include filtration. The method may further include recycling a residual magnesium compound from a filter element and recycling the residual magnesium compound into the supply water.

According to another implementation, a method may include treating supply water. Treating the supply water may include adding an effective amount of a flocculation aiding metal salt to the supply water and removing one or more contaminants from the supply water. Treating the supply water may provide treated potable water. The method may also include determining a corrosivity associated with the treated potable water. The method may further include adding an effective amount of a magnesium compound to the supply water based upon, at least in part, the determined corrosivity associated with the treated potable water to achieve a desired reduced corrosivity associated with the treated potable water.

One or more of the following features may be included. Determining the corrosivity associated with the treated potable water may include determining a Langelier's Index associated with the treated potable water. Adding the effective amount of the magnesium compound may include adding the magnesium compound to the supply water prior to adding the flocculation aiding metal salt. Adding the effective amount of the magnesium compound may include adding the magnesium compound generally along with adding the flocculation aiding metal salt.

The magnesium compound may include magnesium hydroxide exhibiting an alkaline magnesium hydroxide purity of between about 85% to about 100%. The magnesium hydroxide may exhibit a caustic magnesia activity of between about 50 seconds to about 1440 minutes. The magnesium hydroxide may exhibit a particle size of between about 0.1 micron to about 50 microns. The magnesium hydroxide may exhibit a specific surface area of between about 9 m²/g to about 200 m²/g. The magnesium hydroxide may exhibit a stabilized residuals test value of between about 1 milligram to about 50 grams. The magnesium compound may include magnesium oxide exhibiting an alkaline magnesium oxide purity of between about 85% to about 100%. The magnesium oxide may exhibit a caustic magnesia activity of between about 50 seconds to about 1000 seconds. The magnesium oxide may exhibit a particle size of between about 0.1 micron to about 30 microns. The magnesium oxide may exhibit a specific surface area of between about 9 m²/g to about 300 m²/g.

According to yet another implementation, a method may include adding an effective amount of a flocculation aiding metal salt to supply water. The method may also include removing one or more contaminants from the supply water using a bio-filtration process. The method may further include adding an effective amount of a magnesium compound to the supply water to improve performance of the bio-filtration process.

One or more of the following features may be included. The magnesium compound may include magnesium hydroxide exhibiting an alkaline magnesium hydroxide purity of between about 85% to about 100%. The magnesium hydroxide may exhibit a caustic magnesia activity of between about 50 seconds to about 1440 minutes. The magnesium hydroxide may exhibit a particle size of between about 0.1 micron to about 50 microns. The magnesium hydroxide may exhibit a specific surface area of between about 9 m²/g to about 200 m²/g. The magnesium hydroxide may exhibit a stabilized residuals test value of between about 1 milligram to about 50 grams. The magnesium compound may include magnesium oxide exhibiting an alkaline magnesium oxide purity of between about 85% to about 100%. The magnesium oxide may exhibit a caustic magnesia activity of between about 50 seconds to about 1000 seconds. The magnesium oxide may exhibit a particle size of between about 0.1 micron to about 30 microns. The magnesium oxide may exhibit a specific surface area of between about 9 m²/g to about 300 m²/g.

Adding the effective amount of the magnesium compound may include adding the magnesium compound to the supply water prior to adding the flocculation aiding metal salt. Adding the effective amount of the magnesium compound may include adding the magnesium compound generally along with adding the flocculation aiding metal salt.

The details of one or more implementations are set forth in the accompanying drawings and the description below. Other features and advantages will become apparent from the description, the drawings, and the claims.

BRIEF DESCRIPTION OF THE DRAWINGS

FIG. 1 schematically depicts an example water treatment system, wherein the identified coagulant may include the use of metal salts or a polymer.

DESCRIPTION OF EXAMPLE EMBODIMENTS

Supply water may typically be treated in a variety of manners to make it suitable for potable use. For example, water that may ultimately be intended for potable use may often be supplied from surface sources such as rivers, lakes, reservoirs, etc., or from ground water sources, such as wells, aquifers, and the like. The water supply may typically include various contaminants that may make the supply water unsuitable, or undesirable for potable use. Consistent with embodiments of the present disclosure, supply water may be processed to provide treated water that may be suitable for potable use. In an embodiment, treatment of supply water may generally include adding a magnesium compound to the supply water and adding a flocculation aiding metal salt to the supply water. One or more contaminants may be removed from the supply water to provide treated water that may, in some embodiments, be suitable for potable use.

Consistent with some embodiments, magnesium compounds, such as magnesium hydroxide and/or magnesium oxide, may be utilized in combination with flocculation aiding metal salts to improve the efficiency of treatment of water for potable use (e.g., which may also be referred to as "treating potable water," or similar phrasing). For example, flocculation aiding metal salts that may be utilized in connection with the treatment of potable water may include, but are not limited to, alum, ferrous sulfate, ferric sulfate, ferrous chloride, and ferric chloride. Such metal salts may serve as flocculation aids to facilitate the removal of contaminants from supply water. In some situations, the flocculation aiding metal salts may deplete the alkalinity of the supply water, which may lead to treated water having an alkalinity, and/or pH, below a desired level. In some embodiments, the magnesium compounds may, at least in part, offset the alkalinity reduction caused by the flocculation aiding metal salts. In some such embodiments, the treated water may have an alkalinity within a desired alkalinity range. Further, in some such embodiments, the treated water may have a pH that may be within a desired pH range for the treated water. In some embodiments, the magnesium compounds may provide treated water having an alkalinity and/or a pH within a desired range, which may reduce and/or eliminate the need for alkalinity and/or pH modifying processes and/or substances, such as caustic soda and/or lime, which may be expensive and/or potentially dangerous to handle.

In various embodiments, a magnesium compound may be uniquely utilized in connection with treatment of water for potable use. For example, the relatively low solubility of magnesium compounds, such as magnesium hydroxide and/or magnesium oxide, may have generally dissuaded the use of magnesium compounds for the treatment of potable water. For example, the relatively low solubility of magnesium compounds may have given rise to concerns about increased turbidity, increased total suspended solids in the water and/or deleterious effects on filtration processes. Consistent with some embodiments, magnesium compounds may be utilized in connection with the treatment of potable water without undesirably contributing to the turbidity of the water, undesirable levels of total suspended solids in the water, and/or may not excessively negatively impact filtration, or may even improve filtration efficiency. In some embodiments, magnesium compounds having a relatively high reactivity may be utilized in connection with the treatment of potable water. In some embodiments, magnesium compounds, such as Brucite and/or other relatively lower reactivity magnesium compounds may be suitably utilized for achieving certain results. Further, in some embodiments, relatively high reactivity magnesium compounds and relatively lower reactivity magnesium compounds may be used together to achieve a particular effect in treating the water. For example, a relatively high reactivity magnesia and a relatively low reactivity magnesia may be combined when it is desirable to have both a high dissolution effect (e.g., which may supplement soluble Mg+2, OH— and increase pH facilitating flocculation), but also have sufficient particulate magnesia of either high and/or low reactivity to facilitate adsorption of certain contaminants. The relatively low reactivity magnesia may come from the group of compounds including Brucite (naturally occurring Mg(OH)2) and/or Magnesite (naturally occurring MgCO3), both of which may be in the family of magnesia compounds.

In some embodiments of the present disclosure, the use of magnesium compound in connection with the treatment of potable water (i.e., the treatment of water for potable use) may provide for improvements in flocculation performance and may also provide pH control and/or alkalinity control for the treated potable water. In some embodiments, the use of magnesium compound in connection with the treatment of potable water may allow similar and/or improved turbidity removal from gravity sedimentation while utilizing less flocculation aiding metal salts. In some embodiments, the use of magnesium compound in connection with the treatment of potable water may allow similar and/or improved removal of dissolved organic compounds, or total organic compounds while utilizing less flocculation aiding metal salts. In some embodiments, the use of magnesium compounds in connection with potable water treatment may provide a permanent hardness addition to the water to achieve a desired level of hardness in the treated potable water. In some embodiments, the use of magnesium compounds in connection with the treatment of potable water may allow a desired pH and/or alkalinity to be achieved, which may, for example, reduce or eliminate the need for chemical additions, such as caustic soda or lime, for pH and/or alkalinity control. Accordingly, in various embodiments, magnesium compounds may be used in connection with potable water treatment to achieve various results and/or synergistic performance improvements.

As generally discussed above, in an implementation, an effective amount of a magnesium compound may be added to supply water that is to be treated. Treating the supply water may be for the purpose of achieving potable water standards, e.g., which may allow the treated water to be distributed for residential or domestic use, or otherwise suitable for use and/or consumption by individuals. The method may also include adding an effective amount of a flocculation aiding metal salt to the supply water. One or more contaminants may be removed from the supply water to provide the treated water.

For example, and referring also to FIG. 1, as example embodiment of a water treatment system for treating potable water (e.g., for treating supply water to provide potable treated water) is generally shown. Supply water 10, which is to be treated, may include any suitable source of water. For example, supply water 10 may include surface water from lakes, rivers, reservoirs, or the like. Similarly, supply water 10 may include ground water, such as from wells, aquifers, or the like. Various other suitable sources of supply water 10 may also be utilized. One or more coagulants may be added to supply water 10 at coagulation addition 12. In general, and as will be described in greater detail below, the one or more coagulants may aggregate at least a portion of the suspended and/or dispersed contaminants within supply water 10, such that the aggregated contaminants may form larger particles that may be separated from supply water 10 via various contaminant removal mechanisms. In an example embodiment, supply water 10 including the added coagulants may be mixed in flocculation process 14. In flocculation process 14, the coagulants may be effectively mixed with supply water 10 and contaminants within supply water 10 may be allowed to at least partially coalesce or aggregate to form larger particles.

With continued reference to FIG. 1, consistent with the illustrative water treatment process, following flocculation 14, the water being treated may undergo sedimentation/sludge removal 16. During sedimentation/sludge removal 16 the heavier and/or larger aggregated and/or flocculated contaminants may settle out from the water being treated as sediment or sludge. Clear water (e.g., water from which the aggregated and/or flocculated contaminants have settled out) from the sedimentation/sludge removal process 16 may be provided to filtration process 18. Filtration process 18 may utilize one or more physical and/or biological filtration processes to remove at least a portion of remaining contaminants from the water received from the sedimentation/sludge removal process 16. The filtered water may be provided to filtered/treated water storage 20, which may include one or more storage tanks or reservoirs and/or a distribution system for providing the treated potable water to individuals for potable use. In some embodiments, the filtered water may undergo disinfection and/or fluoridation, e.g., to ensure the water is free from any potentially harmful residual contaminants and/or to add any desired additions to the water. Further, in some embodiments, sludge and/or sediment collected during the sedimentation/sludge removal process 16 may be collected and at least partially dewatered or dried during sludge thickening process 22. The at least partially dewatered sludge and/or sediment 16 may be removed for disposal, e.g., in a landfill or via horticultural use.

The magnesium compound and the flocculation aiding metal salts may be added in the coagulation addition process 12. For example, the effective amount of the magnesium compound may be added to supply water 10 at coagulation addition 12. Further, in an example embodiment, the effective amount of the flocculation aiding metal salt may also be added to supply water 10 at coagulation addition 12. In an illustrative embodiment, the magnesium compound may include one or more of magnesium hydroxide and magnesium oxide, as well as some mixture of magnesium hydroxide and magnesium oxide. In some embodiments, mixtures of relatively high reactivity magnesium compounds (e.g., as may be discussed in greater detail below) may be using in combination with one or more relatively lower reactivity magnesium compounds, such as Brucite or magnesite. Further, the flocculation aiding metal salts may include one or more of alum, ferrous sulfate, ferric sulfate, ferrous chloride, and ferric chloride. Various additional and/or alternative coagulants and/or flocculation aids may be utilized.

In general, flocculation aiding metal salts may be utilized as a primary agent for the removal of contaminants from supply water that is to be treated for potable use. For example, often turbidity in supply water, which may be desirably removed to provide potable water, may include silts, sand or silica, clays or alumino-silicates, and natural organic matter ("NOM"). These materials may be at least partially negatively charged in water at near neutral pH. The flocculation aiding metal salts, as well as some other flocculation aiding agents, may often be at least partially positively charged at near-neutral pH. In some embodiments, the flocculation aiding agents (including the flocculation aiding metal salts) may form mixed particulates of the at least partially positively charged flocculation aiding agents and the at least partially negatively charged contaminants, thereby forming enmeshed floc. Various additional and/or alternative mechanisms may also be involved in the flocculation of contaminants within the supply water through the use of the flocculation aiding metal salts.

In some embodiments, the magnesium compounds may be used to improve the removal of unwanted or undesirable raw water constituents, while reducing or eliminating the consequences of using the flocculation aiding metal salts, polymer flocculation aiding agents, as well as other flocculation aiding agents, on the quality of the resultant treated water, as well as on the potable water infrastructure, through which the treated potable water may be distributed to end users for consumption. For example, flocculation aiding metal salts may reduce the pH of the water being treated, and may reduce the alkalinity of the water being treated. As such, the flocculation aiding metal salts may result in a needed increase in the use of pH-dependent disinfection chemicals. Further, the flocculation aiding metal salts may increase the corrosivity of the water being treated, which may result in an increase in the need for corrosion control chemicals. Further, in some situations the use of flocculation aiding metal salts may increase filtration requirements and loading, etc. associated with removal of contaminants from the water being treated.

An effective amount of the magnesium compound added to supply water 10 may facilitate the removal of total organic carbon ("TOC"), as well as the removal of other contaminants. For example, in some embodiments, the effective amount of the magnesium compound may reduce and/or minimize the pH depression caused by the flocculation aiding metal salts. Further, in some embodiments, the effective amount of the magnesium compound may facilitate the formation of metal hydroxides $AlOH_x$, $FeOH_x$, and/or $Mg(OH)_2$, which may enhance flocculation and sedimentation of settleable solids, containing total suspended solids ("TSS") or TOC, in the water. For example, at least partially positively charged metal hydroxides and the at least partially negatively charged contaminant particles may form an enmeshed floc that may facilitate separation from the water being treated. Furthermore, in some embodiments, the adsorption of positive cations, such as $Mg^{+2}$, onto negatively charged particles of contaminants may result in a charge reduction, and thereby provide less resistance to flocculation of the negatively charged contaminants. Additionally, in some embodiments, an increased salt concentration in the water being treated may result in a reduction in the electrical double layer, which may facilitate removal of contaminant particles from the water being treated. As generally discussed above, the effective amount of the magnesium compound may further enhance the quality of treated water in that the treated water may require relatively lower amounts of chemicals and polymers used for disinfection, scale prevention, and reducing water corrosivity. The reduction in the use of the chemicals and polymers may thereby reduce any potentially harmful by-products that such chemicals may cause. Accordingly, in an embodiment, adding the effective amount of the magnesium compound and the flocculation aiding metal salt may be based upon, at least in part, a desired removal of TSS, TOC, dissolved organic carbon ("DOC"), and/or NOM.

In addition improving TOC, DOC and NOM removal in conjunction with flocculation aiding metal salts, in some embodiments the effective amount of the magnesium compound may facilitate and/or aid in the removal of inorganic constituents, such as arsenic, selenium, or the like. For example, the ability to remove, and/or aid in the removal of, inorganic constituents may be a function of residual magnesium hydroxide and/or magnesium oxide solids that may be on a physical filter (e.g. during filtration 18). For example, in some situations the residual magnesium compound may complex aluminum from alum (which may be utilized as a flocculation aiding metal salt). Such a magnesium-aluminum complex may absorb and/or adsorb the inorganics such as arsenic, selenium and other potentially toxic metals. Other processes may be involved and/or responsible for the removal of inorganic materials from the water being treated. Removal of inorganic materials resulting from the use of magnesium compounds for the treatment of potable water may provide a significant benefit to potable water treatment plants, e.g., as stricter EPA guidelines may be established to minimize such contaminants for drinking water.

As generally discussed above, magnesium compounds may be utilized in combination with one or more flocculation aiding metal salts to facilitate contaminant removal from water that may be treated for potable use. For example, an effective amount of the magnesium compound may be added to the supply water to facilitate, promote, and/or improve flocculation efficiency and effectiveness. In some such embodiments, the flocculation efficiency and/or effectiveness may be improved to allow the amount of flocculation aiding metal salts to be reduced, e.g., as compared to the amount that may be required for treating potable water without the use of the magnesium compounds. Further, in some embodiments, the effective amount of the magnesium compound may additionally and/or alternatively compensate for at least a portion of the pH reduction in the water being treated as a result of the addition of the flocculation aiding metal salts and/or compensate for at least a portion of the alkalinity depression in the water being treated as a result of the addition of the flocculation aiding metal salts. In some such embodiments, the need for additional and/or separate chemical additions to the water to compensate for the reduced pH and/or the depressed alkalinity may be reduced and/or eliminated. Further, in some embodiments, the effective amount of the magnesium compound may facilitate and/or promote the removal of inorganic materials from the water being treated. For example, the effective amount of the magnesium compound may facilitate and/or promote the removal of arsenic and/or selenium, and/or various other potentially toxic metals from the water being treated.

In an embodiment, the effective amount of the magnesium compound and the one or more flocculation aiding metal salts may facilitate and/or promote removing organic materials, which may affect color, odors and taste, from the supply water. Example of such organic materials may include, but are not limited to tannic compounds and/or humic compounds. Organic acids, such as tannic acids and/or humic acids, may be a breakdown product of, or be the result of, decomposed plant matter. Such contaminants have been known to result in unwanted taste, coloration and turbidity in potable water, especially in U.S. geographic regions such as South Florida, even after final filtration from the potable water plant into drinking reservoirs. An effective amount of the magnesium compound may be added to the water being treated, along with an effective amount of the one or more flocculation aiding metal salts, and/or polymer treatment agents, to reduce and/or eliminate organic materials in the treated potable water including tannins, tannic acid, humus, humic acid, and other similar organics that may impart undesirable taste or color. In some implementations the removal of organics, and/or the removal of inorganics, may be promoted and/or improved by the further addition of an oxidizer, such as hypochlorite salts, percarbonate salts, peroxides, nitrates and associated salts, or similar, to the supply water.

Adding the effective amount of the magnesium compound may include adding the magnesium compound to the supply water prior to adding the flocculation aiding metal salt. Adding the magnesium compound prior to adding the flocculation aiding metal salt may include adding the magnesium compound at a location that is upstream in the water treatment process relative to a location at which the flocculation aiding metal salt is added. For example, the magnesium compound may be added upstream of, or prior to, the addition of acidic, or low pH, products such as, but not limited to, flocculation aiding metal salts. In some embodiments, the magnesium compound may be added to the supply water and may be dosed to reduce and/or to minimize the potential contribution to finished water turbidity or suspended solids resulting from the magnesium compound. In some embodiments, adding the magnesium compound to reduce and/or minimize the turbidity or suspended solids in the finished, or treated water, may include adding the magnesium in sufficient quantities such that the turbidity and/or suspended solids in the finished water may be minimized and/or reduced. In some embodiments, adding the magnesium compound to reduce and/or minimize the turbidity or suspended solids in the finished water may include adding the magnesium compound sufficiently upstream in the water treatment process to allow sufficient dissolution or collection (e.g., via sedimentation and/or filtration) of the magnesium compound to reduce and/or minimize turbidity or suspended solids in the finished water. In an embodiment, adding the magnesium compound prior to adding the flocculation aiding metal salts may include adding the magnesium compound at an upstream location within coagulant addition process 12 relative to the location at which the flocculation aiding metal salt is added. In some embodiments, adding the effective amount of the magnesium compound may include adding the magnesium compound generally along with adding the flocculation aiding metal salt. For example, the magnesium compound may be added at generally the same location within the coagulant addition process 12 as the flocculation aiding metal salts. Still further, in some embodiments, the magnesium compound may be added to the supply water after the addition of the flocculation aiding metal salt.

In some embodiments, the quality and reactivity of magnesium compound may be selected to provide desirable performance. For example, in some situations it may be possible that any un-dissolved magnesium compound that accumulates in a filter utilized in connection with potable water treatment may continue to dissolve and may improve capture in the filter. In some situations, a relatively less reactive grade of magnesia, such as Brucite, may not provide a comparable rate of dissolution, and thus may exhibit more characteristics of fouling than might be achieved with relatively more reactive grades of magnesia. Illustrative examples of relatively more reactive magnesium compound may include Thioguard® and Magox® brands of magnesium hydroxide and magnesium oxide available from Premier Magnesia, LLC. The mechanisms for improved performance associated with relatively higher reactivity magnesium compounds may, in some implementations, be based upon, at least in part, the characteristics of the matrix formed by the media, the filter, the magnesia and the metal salt, and may account for the better overall performance. However, in some implementations less reactive grades of magnesia may be acceptably utilized to varying degrees of efficacy. In some implementations, relatively less reactive grades of magnesium compounds may be used in conjunction with relatively higher reactivity grades of magnesium compounds to achieve a specific result.

In an example embodiment, magnesium compounds (e.g., magnesium oxide and/or magnesium hydroxide) may be utilized having a relatively high degree of purity. In an example embodiment, magnesium compounds may be provided having an alkaline magnesium oxide and/or alkaline magnesium hydroxide purity of between about 85% to about 100% pure alkaline magnesium oxide and/or magnesium hydroxide. In an illustrative embodiment, a magnesium compound may be provided having an alkaline magnesium oxide and/or alkaline magnesium hydroxide purity of between about 91% to about 98% pure alkaline magnesium oxide and/or magnesium hydroxide.

In some embodiments, the stability of the magnesium hydroxide may be generally related to the ability of a magnesium hydroxide slurry to maintain pumpability while minimizing solids residue that may accumulate in a storage and/or transportation tank (e.g., rail tank, tanker truck, etc.), which may become difficult to re-suspend. Accordingly, the stability of the magnesium hydroxide may be indicative of the ability of a magnesium hydroxide slurry to withstand transportation and storage, while remaining susceptible to dispensing, as through pumping. In an example embodiment, the stability of a magnesium hydroxide slurry may be quantified using the stabilized residuals test ("SRT-Tap Test"). In general, the SRT-Tap test may assess the solids settling stability of magnesium hydroxide suspensions. According to an embodiment, an eight fluid ounce test bottle may be filled with a magnesium hydroxide slurry. The magnesium hydroxide slurry may be retained in the test bottle for a fourteen hour period, with the test bottle maintained in an upright position. After fourteen hours, sediment collecting in the bottom of the test bottle (e.g., as a result of magnesium hydroxide falling out of suspension) may be evaluated. The test bottle containing the slurry and/or any collected sediment may be vigorously shaken in a horizontal orientation of the test bottle for fifteen seconds, and the slurry may then be poured out of the test bottle. The test bottle may subsequently be filled with approximately an inch and a half of water, which may be swirled within the bottle to remove slurry film from the side of the bottled. The water may be poured from the test bottle and the test bottle may be inverted to drain for fifteen minutes. A difference between the post draining weight of the test bottle and an initial weight (e.g., prior to initially filling the test bottle with magnesium hydroxide slurry) may be determined. According to various embodiments, a suitable magnesium hydroxide may provide an SRT-Tap test value of between about 1 milligram and about 50 grams. In some embodiments, a suitable magnesium hydroxide may provide an SRT-Tap test value of between about 0.1 gram to about 50 grams. In an embodiment, a suitable magnesium hydroxide may provide an SRT-Tap test value of between about 1 gram to about 50 grams. In an example embodiment, a suitable magnesium hydroxide may provide an SRT-Tap Test value of between about 1 gram and about 20 grams. In a particular embodiment, a suitable magnesium hydroxide may provide an SRT-TAP Test value of between about 1 gram and about 20 grams, with an average value of about 10 grams.

In some embodiments, a magnesium compound may include magnesium hydroxide exhibiting a caustic magnesia activity ("CMA") neutralization time of between about 50 seconds to about 1440 minutes using 1.0N acetic acid and a magnesium hydroxide content of between about 10% to about 100%. In some embodiments, a magnesium compound may include magnesium oxide exhibiting a caustic magnesia activity neutralization time of between about 30 seconds to about 3600 seconds using 1.0N acetic acid and a magnesium oxide content of between about 10% to about 100%. In some embodiments, a magnesium compound may include magnesium oxide exhibiting a caustic magnesia activity neutralization time of between about 50 seconds to about 1000 seconds using 1.0N acetic acid and a magnesium oxide content of between about 10% to about 100%. In an embodiment, the magnesium compound may be provided exhibiting a caustic magnesia activity neutralization time of between about 50 seconds to about 200 seconds using a 1.0N acetic acid and a magnesium oxide and/or magnesium hydroxide content of between about 10% to about 100%. In a particular example embodiment, the magnesium compound may be provided exhibiting a caustic magnesia activity neutralization time of about 125 seconds using a 1.0N acetic acid and a magnesium oxide and/or magnesium hydroxide content of between about 10% to about 100%.

In an embodiment, the magnesium compound may be provided having a particle size that may provide an enhanced specific surface area ("SSA"). For example, generally, a magnesium compound having a smaller particle size may enhance the overall specific surface area of the magnesium compound (e.g., which may include magnesium oxide and/or magnesium hydroxide). In an embodiment, a magnesium compound may include a magnesium hydroxide exhibiting a particle size of between about 0.1 micron to about 50 micron. In some embodiments, a magnesium compound may include magnesium oxide exhibiting a particle size of between about 0.1 micron to about 30 micron. For example, in an embodiment, the magnesium compound may include a magnesium oxide and/or magnesium hydroxide having a particle size of between about 1 micron to about 20 microns. In one illustrative embodiment, the magnesium compound may include a magnesium oxide and/or magnesium hydroxide having an average particle size of about 10 micron.

In addition to the average particle size, the magnesium compound may be provided having a particle size distribution that may improve the stability of a slurry produced using the magnesium compound. As generally discussed above, a higher degree of stability of a slurry produced using the magnesium compound may generally relate to the ability to maintain pumpability of the slurry while minimizing solids residue that may accumulate in a storage and/or transportation tank. In some situations, a relatively more narrow particle size distribution of the magnesium compound may increase the stability of a slurry produced using the magnesium compound. In an embodiment, particle size and particle size distribution may be measured and/or controlled using screen analysis and a particle size distribution analyzer.

In an embodiment, a magnesium compound may be provided having a desired reactivity. A magnesium compound having a relatively higher reactivity may provide more complete and efficient use within a desired application, and may, in some instances, at least partially offset a relatively low solubility that may be associated with magnesium compounds such as magnesium oxide and/or magnesium hydroxide. In an embodiment, specific surface area ("SSA") of the magnesium compound may be correlated to reactivity, e.g., in which a relatively higher specific surface area may be correlated to a relatively higher reactivity. In some embodiments, a magnesium compound may include magnesium hydroxide exhibiting a specific surface area of between about 9 $m^2/g$ to about 200 $m^2/g$. For example, in an example embodiment, a magnesium compound may include magnesium hydroxide having a specific surface area in the range of between about 9 $m^2/gram$ to about 50 $m^2/gram$. In one particular embodiment, a magnesium hydroxide may include a specific surface area of about 12 $m^2/gram$. In some embodiments, a magnesium compound may include magnesium oxide exhibiting a specific surface area of between about 9 $m^2/g$ to about 300 $m^2/g$, or greater. For example, in an example embodiment, a magnesium compound may include magnesium oxide having a specific surface area in the range of between about 9 $m^2/gram$ to about 150 $m^2/gram$, or greater.

While magnesium compounds having various different characteristics (such as purity, SRT-Tap Test values, CMA, particle size, and SSA) have been described, it will be understood that such characteristics, and representative values, are provided for the purpose of illustration and example. Consistent with the present disclosure, magnesium oxide and/or magnesium hydroxide compounds having different characteristic values may be utilized in connection with treating potable water to varying degrees of efficacy, either individually or in combination.

In some embodiments, combinations of magnesium compounds having different reactivities may be utilized in connection with the treatment of potable water. For example, in an embodiment relatively high reactivity magnesium compounds and relatively lower reactivity magnesium compounds may be used together to achieve a particular effect in treating the water. In some embodiments, the combination of magnesium compounds having different reactivities may achieve synergistic benefits. For example, combinations of magnesium compounds having differing reactivities may be added to water being treated to aid in removing a particular contaminant from the water. In some such embodiments, the different magnesium compounds having different reactivities may provide a synergistic result, for example, in terms of removing particular contaminants, controlling pH or alkalinity of the potable water, etc.

The method may further include adding an effective amount of a polymer contaminant removal aid including one or more of polyepichlorohydrin-dimethylamine, polyamine, polydiallyl-dimethylammonium chloride (polyDADMAC), polyacrylate, polyamide, a Mannich polymer, and polyacrylamide. For example, and as generally described above, organic solids, which may often be measured and/or reported as TOC, may be removed, at least in part, through the addition of flocculation aiding metal salt such as alum (e.g., aluminum sulfate), ferrous chloride, ferric chloride, ferrous sulfate, ferric sulfate, or other metal chlorides or salts to promote flocculation and coagulation of solids. The flocculated and/or coagulated solids may then be removed through the process of sedimentation 16 or filtration process 18. An effective amount of the magnesium compound may be added to the water being treated (e.g., supply water 10). For example, the magnesium compound may be added to the water being treated upstream relative to the addition of the flocculation aiding metal salt. The addition of the effective amount of the magnesium compound may reduce, and/or prevent, the depletion of alkalinity from water and/or may reduce, and/or prevent, the depression of pH. In such an implementation, the addition of the magnesium compound may increase processing efficiency and/or reduce corrosiveness of the water, which may be, at least in part, attributed to the use of the flocculation aiding metal salts for treating the water. In some implementations, magnesia may similarly be used in connection with polymers (such as, but not limited to, polyepichlorohydrin-dimethylamines, polyamines, polydiallyl-dimethylammonium chloride (polyDADMAC), polyacrylates, polyamides, Mannichs, polyacrylamides, etc.) which may also be used in connection with water treatment. Such polymers, or polymeric compounds, may aid the coagulation/flocculation process, for example, by adding positively or negatively charged substrates to facilitate the agglomeration of oppositely charged contaminants and flocculation aids. Accordingly, in some embodiments, an effective amount of a polymer flocculating or solids conditioning aid may be added to the water supply. In some such embodiments, the further combination of magnesium compounds and polymer coagulation/flocculation aids may provide improved contaminant removal. Further, in some embodiments, the use of magnesium compounds in combination with polymer coagulation/flocculation aids may reduce the quantity of polymer coagulation/flocculation aids that may be required to achieve a similar contaminant removal (e.g., as compared to a quantity of polymer coagulation/flocculation aid that may be utilized in the absence of the magnesium compound).

Adding the magnesium compound may include adding an admixture of the magnesium compound and an alkaline earth metal compound. For example, in an embodiment, the effective amount of the magnesium compound may increase divalent cation concentration in the water, which may improve wastewater treatment, after the potable water has been used by individuals and/or businesses. For example, increasing the divalent cation concentration may improve wastewater treatment in terms of clarification, sedimentation, dewatering etc., by counteracting the imbalances created by sodium and other monovalent compounds that may be discharged to the sewer system. In an embodiment, adding the magnesium compound in admixture with one or more alkaline earth metal compounds, such as beryllium compounds, other magnesium compounds, calcium compounds, strontium compounds, barium compounds, and/or radium compounds, may facilitate increasing the divalent cation concentrations in the treated potable water.

Adding the effective amount of the magnesium compound includes measuring a quality of the treated water. For example, as generally discussed, flocculation aiding metal salts, as well as various other agents used in the treatment of potable water may impact various water quality attributes, e.g., which may render such quality attributes less desirable. Additionally, the supply water may have various quality attributes that may be less desirable, e.g., even prior to treatment with flocculation aiding metal salts and/or other agents. As such, the effective amount of the magnesium compound may at least partially compensate for less desirable water quality attributes. For example, the quality of the treated water may include one or more of an alkalinity of the treated water and a pH of the treated water. Adding the effective amount of the magnesium compound may include measuring the pH and/or alkalinity of the treated water to determine the effective amount of the magnesium compound, e.g., which may at least partially provide a desirable pH and/or alkalinity in the treated water.

As generally discussed above, the flocculation aiding metal salt, as well as other agents used to treat the potable water, may deplete the alkalinity of the treated water. In an embodiment, an anticipated alkalinity depletion associated with adding the flocculation aiding metal salt may be determined. Additionally/alternatively an anticipated pH decrease associated with adding the flocculation aiding metal salt may be determined. One or more of the determined anticipated alkalinity depletion and/or pH decrease associated with adding the flocculation aiding metal salt may allow an effective amount, and/or an initial anticipated effective amount, of the magnesium compound to be determined. For example, the effective amount, and/or the initial anticipated effective amount of the magnesium compound may be based upon, at least in part, an amount of the magnesium compound offsetting at least a portion of the anticipated alkalinity depletion.

The effective amount of the magnesium compound may be adjusted based upon, at least in part, the measured quality of the treated water. For example, the initial anticipated effective amount of the magnesium compound may be added to the supply water based upon, at least in part, an anticipated alkalinity depletion and/or pH decrease. Subsequently, the actual alkalinity, pH, and/or another water quality attribute of the treated water may be determined. The effective amount of the magnesium compound added to the supply water may be adjusted from the initial anticipated effective amount, e.g., to achieve and/or more closely approach a desired water quality attribute.

In an embodiment, the magnesium compound may be added in sufficient quantities to the finished potable water to increase pH and/or alkalinity levels in the wastewater collection system that may receive the potable water after it has been used by homes or businesses. In an example, the pH and/or alkalinity levels present in the waste water may be sufficient to prevent and/or reduce such issues as odors, corrosion, FOG, etc once the water passes to the wastewater collection system. In addition/as an alternative to compensating for any depletion in the alkalinity of the treated water resulting from the use of the flocculation aiding metal salt, in an embodiment the alkaline value of the potable water to be distributed may be increased to be greater than the alkaline value of the supply water. In some such embodiments, the treated potable water may have a greater value in terms of wastewater treatment. That is, once the treated potable water has been used by consumers and passed into the wastewater collection system, the resultant wastewater may have a higher alkaline value than the initial supply water, and thereby may render the wastewater more resistant to problems in wastewater treatment such as odors, corrosion, and acid production from biological treatment.

In an embodiment, the magnesium value of the potable water to be distributed may be greater than before treatment, and therefore may have a greater value in terms of health benefits to the consumers of the potable water. For example, many individuals may be at least partially deficient in nutritional magnesium. In a similar manner as other beneficial additions, such a fluoride, the effective amount of magnesium compound may provide beneficial nutritional magnesium to individuals who drink the treated potable water. In this regard, there is suggestion and/or evidence that appropriate nutritional magnesium intake may prevent Type 2 diabetes, prevent osteoporosis, reduce migraine headaches, reduce cardiovascular disease, and/or lower blood pressure. In some embodiments, the effective amount of the magnesium compound may provide the potential for one or more such health benefits to individuals consuming the treated potable water. In an embodiment, such an effective amount of the magnesium compound may be based upon, at least in part, a measured effective nutritional magnesium quality of the treated potable water. Selection of the quality of magnesia may be based in part on the quantity of magnesium desired in the treated water. In some situations, lower reactivity forms of magnesia may be captured during sedimentation or filtration, which may prevent the desired magnesium fortification from being achieved through magnesia introduced to the treatment process. Magnesium may still be added to the finished water in the forms of more highly soluble salts, including but not limited to magnesium chloride, magnesium sulfate, magnesium citrate, etc.

In an embodiment, the quality of the treated water may include a corrosivity of the treated water as indicated by a Langelier Index of the treated water. For example, in an implementation, the magnesium compound may be utilized for treating supply water, at least in part to control and/or reduce the corrosivity of the treated water. Accordingly, in an implementation, supply water may be treated including adding an effective amount of a flocculation aiding metal salt to the supply water and removing one or more contaminants from the supply water. Treating the supply water may provide treated potable water. Further, a corrosivity associated with the treated potable water may be determined. An effective amount of a magnesium compound may be added to the supply water based upon, at least in part, the determined corrosivity associated with the treated potable water to achieve a desired reduced corrosivity associated with the treated potable water. For example, the determined corrosivity associated with the treated potable water may be based upon, at least in part, one or more of a quality of the supply water, a corrosivity resulting from the flocculation aiding metal salts, and/or one or more other agents utilized in treating the potable water. As generally described above, corrosivity of the water may be quantified, or represented, using the Langelier's Index. Accordingly, in an embodiment, determining the corrosivity associated with the treated potable water may include determining a Langelier's Index associated with the treated potable water. Further, the effective amount of the magnesium compound added to the supply water and/or to the treated potable water may include an amount sufficient to provide an Langelier's Index value associated with the treated potable water that may indicate a desired degree of corrosivity, for example, a relatively low level of corrosivity associated with the treated potable water. In some embodiments, the reduction in corrosivity associated with the treated potable water may eliminate, or reduce, the need for corrosion inhibiting agents, such as phosphates, which may conventionally be utilized in connection with treated water. Accordingly, in some embodiment, the use of corrosion control agents, such as phosphates, polyphosphates, phosphonates, may be optimized and/or reduced based upon, at least in part, the corrosivity of the water and the effective amount of magnesium compound added to the supply water.

As generally described above, the treatment of the supply water to provide treated potable water may include removing one or more contaminants from the supply water to provide treated water. Removing one or more contaminants from the supply water may include one or more of flocculation, coagulation, sedimentation and filtration. For example, one or more contaminants may be removed from the water via the flocculation process 14 and/or the sedimentation process 16. Further, and as also described with respect to FIG. 1, removing one or more contaminants may include filtration (e.g., via filtration process 18). In some embodiments utilizing filtration to remove one or more contaminants, the performance of the filtration process may be evaluated in terms or contaminant removal performance and maintenance. Conventionally, because magnesium hydroxide may have a relatively low solubility, magnesium hydroxide has generally been dismissed as an alkaline modifier in potable water treatment, due to potential increases in TSS and turbidity, or clogging and scaling of filters. Uniquely, consistent with an aspect of the present disclosure, magnesium compounds may be used to improve the performance of the filters, both in terms of reduced final TSS and turbidity, but also in terms of backwash requirements for filtration. In some embodiments, at least a portion of any residual magnesium compound captured in a filter may be recycled from a filter element back into the supply water (e.g., as generally indicated by arrow 24 in FIG. 1). For example, when a filter element is backwashed, e.g., to remove any build-up of material that may reduce the performance of the filter, at least a portion of the backwash, which may include residual magnesium compound, may be returned to specific parts of the treatment process. Returning at least a portion of the backwash (e.g., recycling residual magnesium compound) to specific parts of the treatment process may enhance the flocculation and sedimentation processes preceding filtration, and may minimize and/or reduce the requirements of the magnesium compounds and/or the flocculation aiding metal salts to the raw supply water.

In some embodiments, removing one or more contaminants from the supply water may include using a bio-filtration process. Bio-filtration processes may include removing organic material from the water using a biological process. In such an embodiment, adding the effective amount of the magnesium compound may include adding an effective amount of the magnesium compound to the supply water to improve the performance of the bio-filtration process. As generally mentioned bio-filtration may include biological removal of contaminants through a bio-filter or bio-media. In such bio-filtration processes, organic material may be removed biologically, and the magnesium compound may serve as a nutrient and cationic enhancement to the microorganisms and/or to the structure of the biological matrix, which may thereby improve biological performance. In addition/as an alternative to improving biological performance, the magnesium compound may reduce and/or minimize problems associated with sloughing and clogging of biomass. Further, in some embodiments, the magnesium compound may serve to make the organics more digestible.

Consistent with the foregoing, in some implementations, the magnesium compound may be optimized not only for flocculation aiding metal salt use but may also be optimized for filtration performance. In some implementations, the magnesium compound may be added in sufficient quantities to the water being treated to improve the performance of the filters, whether stratified media or membrane. The magnesium compound may be dosed sufficiently to actively reduce the required quantities of flocculation aiding metal salts, to reduce inorganic and organic loading to the filtration process, to reduce the impacts of scaling/fouling, and/or to reduce or minimize backwash or replacement rates of media and filters. In implementations utilizing bio-filtration, the magnesium compound may be added in sufficient quantities to improve performance of the bio-filters in terms of organics removal from the water stream and overall health of the biomass.

Consistent with the foregoing, in some implementations, processing the supply water to provide potable water may include removing constituents (such as contaminants) from the water that may be harmful. Processing the supply water to provide potable water may also include removing other constituents that may impart undesirable color, taste, turbidity or odor. The removed constituents may be in the form of dissolved solids or gases, suspended solids or gases, miscible or immiscible liquids, and may be organic and/or inorganic in nature. These constituents may be measured as Total Organic Carbon ("TOC"), Total Dissolved Solids ("TDS"), and Total Suspended Solids ("TSS"). In some situations, specific constituents such as minerals may be identified in more detail.

According to various embodiments and implementations, the present disclosure may utilize magnesium compounds in combination with flocculation aiding metal salts in the treatment of water to make the water suitable for potable use. In some embodiments, the utilization of the magnesium compounds may improve the effectiveness of flocculation aiding metal salt use in the treatment of potable water. Consistent with some embodiments, the magnesium compound and the flocculation aiding metal salt may be dosed to achieve optimal and/or improved TSS and/or TOC removal, and may achieve a reduction in turbidity. In some embodiments, the magnesium compound may be added in sufficient quantities to reduce or eliminate aluminum and/or iron in the finished potable water and/or in the sludge or sediment recovered during the treatment process. Similarly, the magnesium compound may also reduce or eliminate the need for polymer additives.

Often in other areas of water treatment, such as wastewater treatment, there has been suggestion that flocculation performance may deteriorate as pH rises. However, consistent with the present disclosure, the use of magnesium compounds and the resultant increase and/or stabilization of pH has been found to improve flocculation performance. It may be possible that according to prior processes, which realized a decrease in flocculation performance as pH rises, pH may have been modified using caustic soda or lime. In the case of caustic soda use, for example, the sodium added to the system when using sodium hydroxide may be deleterious to flocculation and sedimentation. Consistent with the present disclosure, it may be the case that because of the specific particulate and cationic properties, magnesium compounds used for pH elevation in conjunction with the flocculation aiding metal salts may lead to improved performance of the system for flocculation and sedimentation.

In some embodiments, the magnesium compounds may be added in sufficient quantities to increase and/or optimize metal hydroxide formation. Further, in some implementations, magnesium compounds may be added in sufficient quantities to reduce the required amount of disinfection chemicals necessary to achieve potable water standards. As generally described above, the magnesium compounds may be added to the water being treated in sufficient quantities, and along with one or more flocculation aiding metal salts, polymers, and/or one or more oxidizers, in order to remove and/or reduce organics or undesirable inorganics such as arsenic or selenium. Further, in some implementations, the magnesium compounds may be added to the water being treated in sufficient quantities to alter the Langelier index to indicate the potable water produced may be less corrosive.

In addition, as an alternative to possible potable water treatment performance increases, in some implementations magnesium compounds utilized in connection with the treatment of potable water may provide various health benefits. For example, increasing the residual magnesium content in potable water, which is valued by the WHO (World Health Organization) for providing specific health benefits, may provide some reduction in heart disease and diabetes, and/or may provide other health benefits.

A number of implementations have been described. Nevertheless, it will be understood that various modifications may be made. Accordingly, other implementations are within the scope of the following claims.

What is claimed is:

1. A method comprising:
   adding an effective amount of a magnesium compound to supply water to be treated, wherein the magnesium compound includes magnesium hydroxide exhibiting an alkaline magnesium hydroxide purity of between about 85% to about 100%; a caustic magnesia activity of between about 50 seconds to about 1440 minutes; a particle size of between about 0.1 micron to about 50 microns; a specific surface area of between about 9 $m^2/g$ to about 200 $m^2/g$; and a stabilized residuals test value of between about 1 milligram to about 50 grams;
   adding an effective amount of a flocculation aiding metal salt to the supply water; and
   removing one or more contaminants from the supply water to provide treated water.

2. The method of claim 1, wherein the flocculation aiding metal salt includes one or more of alum, ferrous sulfate, ferric sulfate, ferrous chloride, and ferric chloride.

3. The method of claim 1, wherein adding the effective amount of the magnesium compound includes adding the magnesium compound to the supply water prior to adding the flocculation aiding metal salt.

4. The method of claim 1, wherein adding the effective amount of the magnesium compound includes adding the magnesium compound generally along with adding the flocculation aiding metal salt.

5. The method of claim 1, wherein adding the effective amount of the magnesium compound includes measuring a quality of the treated water.

6. The method of claim 5, further including adjusting the effective amount of the magnesium compound based upon, at least in part, the measured quality of the treated water.

7. The method of claim 5, wherein the quality of the treated water includes one or more of an alkalinity of the treated water and a pH of the treated water.

8. The method of claim 5, wherein the quality of the treated water includes a corrosivity of the treated water as indicated by a Langelier Index of the treated water.

9. The method of claim 1, further including determining an anticipated alkalinity depletion associated with adding the flocculation aiding metal salt, and wherein the effective amount of the magnesium compound is based upon, at least in part, amount offsetting at least a portion of the anticipated alkalinity depletion.

10. The method of claim 1, further including adding an effective amount of a polymer contaminant removal aid including one or more of polyepichlorohydrin-dimethylamine, polyamine, polydiallyl-dimethylammonium chloride (polyDADMAC), polyacrylate, polyamide, a Mannich polymer, and polyacrylamide.

11. The method of claim 1, wherein removing one or more contaminants from the supply water includes one or more of flocculation, coagulation, sedimentation, and filtration.

12. The method of claim 11, wherein removing one or more contaminants from the supply water includes filtration, and further including recycling a residual magnesium compound from a filter element and recycling the residual magnesium compound into the supply water.

13. The method of claim 1, wherein adding the magnesium compound includes adding an admixture of the magnesium compound and an alkaline earth metal compound.

14. A method comprising:
   treating supply water, including adding an effective amount of a flocculation aiding metal salt to the supply water and removing one or more contaminants from the supply water, to provide treated potable water;
   determining a corrosivity associated with the treated potable water;
   adding an effective amount of a magnesium compound to the supply water based upon, at least in part, the determined corrosivity associated with the treated potable water to achieve a desired reduced corrosivity associated with the treated potable water.

15. The method of claim 14, wherein determining the corrosivity associated with the treated potable water includes determining a Langelier's Index associated with the treated potable water.

16. The method of claim 14, wherein the magnesium compound includes magnesium hydroxide exhibiting an alkaline magnesium hydroxide purity of between about 85% to about 100%; a caustic magnesia activity of between about 50 seconds to about 1440 minutes; a particle size of between about 0.1 micron to about 50 microns; a specific surface area of between about 9 $m^2/g$ to about 200 $m^2/g$; and a stabilized residuals test value of between about 1 milligram to about 50 grams.

17. The method of claim 14, wherein the magnesium compound includes magnesium oxide exhibiting an alkaline magnesium oxide purity of between about 85% to about 100%; a caustic magnesia activity of between about 30 seconds to about 3600 seconds; a particle size of between about 0.1 micron to about 30 microns; and a specific surface area of between about 9 $m^2/g$ to about 300 $m^2/g$.

18. The method of claim 14, wherein adding the effective amount of the magnesium compound includes adding the magnesium compound to the supply water prior to adding the flocculation aiding metal salt.

19. The method of claim 14, wherein adding the effective amount of the magnesium compound includes adding the magnesium compound generally along with adding the flocculation aiding metal salt.

20. A method comprising:
adding an effective amount of a magnesium compound to supply water to be treated, wherein the magnesium compound includes magnesium oxide exhibiting an alkaline magnesium oxide purity of between about 85% to about 100%; a caustic magnesia activity of between about 30 seconds to about 3600 seconds; a particle size of between about 0.1 micron to about 30 microns; and a specific surface area of between about 9 $m^2/g$ to about 300 $m^2/g$;
adding an effective amount of a flocculation aiding metal salt to the supply water; and
removing one or more contaminants from the supply water to provide treated water.

21. The method of claim 20, wherein the flocculation aiding metal salt includes one or more of alum, ferrous sulfate, ferric sulfate, ferrous chloride, and ferric chloride.

22. The method of claim 20, wherein adding the effective amount of the magnesium compound includes adding the magnesium compound to the supply water prior to adding the flocculation aiding metal salt.

23. The method of claim 20, wherein adding the effective amount of the magnesium compound includes adding the magnesium compound generally along with adding the flocculation aiding metal salt.

24. The method of claim 20, wherein adding the effective amount of the magnesium compound includes measuring a quality of the treated water.

25. The method of claim 24, further including adjusting the effective amount of the magnesium compound based upon, at least in part, the measured quality of the treated water.

26. The method of claim 24, wherein the quality of the treated water includes one or more of an alkalinity of the treated water and a pH of the treated water.

27. The method of claim 24, wherein the quality of the treated water includes a corrosivity of the treated water as indicated by a Langelier Index of the treated water.

28. The method of claim 20, further including determining an anticipated alkalinity depletion associated with adding the flocculation aiding metal salt, and wherein the effective amount of the magnesium compound is based upon, at least in part, amount offsetting at least a portion of the anticipated alkalinity depletion.

29. The method of claim 20, further including adding an effective amount of a polymer contaminant removal aid including one or more of polyepichlorohydrin-dimethylamine, polyamine, polydiallyl-dimethylammonium chloride (polyDADMAC), polyacrylate, polyamide, a Mannich polymer, and polyacrylamide.

30. The method of claim 20, wherein removing one or more contaminants from the supply water includes one or more of flocculation, coagulation, sedimentation, and filtration.

31. The method of claim 30, wherein removing one or more contaminants from the supply water includes filtration, and further including recycling a residual magnesium compound from a filter element and recycling the residual magnesium compound into the supply water.

32. The method of claim 30, wherein adding the magnesium compound includes adding an admixture of the magnesium compound and an alkaline earth metal compound.

* * * * *